United States Patent
Smith et al.

(10) Patent No.: US 11,911,659 B2
(45) Date of Patent: Feb. 27, 2024

(54) LOCAL POSITIONING SYSTEM USING TWO-WAY RANGING

(71) Applicant: Integrated Bionics, Inc., Houston, TX (US)

(72) Inventors: Stéphane Louis Smith, Richmond, TX (US); Yves Kevin Smith, Richmond, TX (US)

( * ) Notice: Subject to any disclaimer, the term of this patent is extended or adjusted under 35 U.S.C. 154(b) by 0 days.

(21) Appl. No.: 18/156,652

(22) Filed: Jan. 19, 2023

(65) Prior Publication Data
US 2023/0226409 A1    Jul. 20, 2023

Related U.S. Application Data

(60) Provisional application No. 63/266,911, filed on Jan. 19, 2022.

(51) Int. Cl.
*A63B 24/00*    (2006.01)

(52) U.S. Cl.
CPC .. *A63B 24/0021* (2013.01); *A63B 2024/0025* (2013.01); *A63B 2220/13* (2013.01)

(58) Field of Classification Search
CPC .................................................. A63B 24/0021
See application file for complete search history.

(56) References Cited

U.S. PATENT DOCUMENTS

| | | | |
|---|---|---|---|
| 8,248,212 B2 * | 8/2012 | Frederick | H04L 1/0052 370/252 |
| 8,249,254 B1 * | 8/2012 | Daniel | A63B 71/06 380/255 |
| 8,451,121 B2 * | 5/2013 | Hook | G01S 13/878 340/5.2 |
| 9,849,361 B2 * | 12/2017 | Coza | G09B 19/0038 |
| 9,950,238 B2 | 4/2018 | DeAngelis et al. | |
| 10,924,157 B2 * | 2/2021 | Torborg | H04W 56/002 |
| 2009/0256688 A1 * | 10/2009 | Khan | A63B 24/0087 340/323 R |
| 2011/0054782 A1 * | 3/2011 | Kaahui | A63B 69/3608 73/865.4 |
| 2013/0130843 A1 * | 5/2013 | Burroughs | G01S 13/751 473/415 |
| 2014/0247817 A1 * | 9/2014 | Lim | H04W 52/0216 370/336 |
| 2014/0253388 A1 * | 9/2014 | Jalali | G01S 5/02216 342/458 |
| 2014/0266160 A1 * | 9/2014 | Coza | A63B 47/008 324/207.11 |
| 2014/0277636 A1 * | 9/2014 | Thurman | A63B 69/0002 700/91 |
| 2014/0358574 A1 * | 12/2014 | Tara | G06Q 10/06 705/2 |

(Continued)

*Primary Examiner* — Irfan Habib
(74) *Attorney, Agent, or Firm* — SoCal IP Law Group LLP; Jonathan Pearce; John Gunther

(57) ABSTRACT

There is disclosed a system for local positioning. The system includes a plurality of anchors placed within a facility, the anchors in fixed positions following a calibration procedure, and a plurality of movable tags, attached to individuals and/or objects used to play a sport within the facility. A tracking server for using the plurality of anchors, in two-way-ranging communication with the plurality of movable tags, to track movement of the plurality of movable tags within the facility on an as-desired basis.

19 Claims, 12 Drawing Sheets

(56) References Cited

U.S. PATENT DOCUMENTS

| | | | | |
|---|---|---|---|---|
| 2014/0364974 | A1* | 12/2014 | Wohl | G09B 19/0038 |
| | | | | 700/91 |
| 2015/0071158 | A1* | 3/2015 | Fan | H04L 45/026 |
| | | | | 370/312 |
| 2016/0112727 | A1* | 4/2016 | Mate | G06F 16/739 |
| | | | | 725/32 |
| 2017/0092090 | A1* | 3/2017 | Lerner | G08B 13/2462 |
| 2017/0128814 | A1* | 5/2017 | Ianni | H04W 4/029 |
| 2020/0287590 | A1* | 9/2020 | Torborg | H04B 1/7183 |
| 2022/0268875 | A1* | 8/2022 | Szebenyei | G01S 13/74 |
| 2022/0270458 | A1* | 8/2022 | Mann | G08B 21/0272 |
| 2022/0272504 | A1* | 8/2022 | Hága | G01S 5/0244 |
| 2022/0395724 | A1* | 12/2022 | Xu | H04W 4/029 |
| 2023/0152652 | A1* | 5/2023 | Trikha | H10K 59/65 |
| | | | | 700/276 |

* cited by examiner

LOCAL POSITIONING SYSTEM USING TWO-WAY RANGING

RELATED APPLICATION INFORMATION

This patent claims priority from U.S. provisional patent application No. 63/266,911 filed Jan. 19, 2022 and entitled "POP UP LOCAL POSITIONING SYSTEM IN SPORTS," the entirety of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to local positioning and more particularly to a system for local positioning using two-way-ranging.

Description of the Related Art

There exist robust systems of global positioning. These systems include the U.S.-based Global Positioning System (GPS) and the Russian-founded Global'naya Navigasionnaya Sputnikovaya Sistema (GLONASS). There are other systems used by other nations. These systems are generally quite robust and accurate for their intended purpose, namely, navigation. But, the best of these systems are typically accurate up to about one meter. They can be augmented by ground-based systems—including wireless internet systems—to become even more accurate up to a foot or even a few inches. This is quite impressive accuracy for a system primarily operating from low-orbit.

These kinds of systems are often used in outdoor sports, particularly professional and collegiate-level sports, to track players and objects on the field (e.g. the ball) as a competition or practice takes place. Individual GPS trackers may be placed on a series of players and objects or even portions of the field and the players' and ball's movement, acceleration, and position can be accurately tracked throughout a given sports exercise. Similar systems are increasingly employed in logistics (e.g. shipping), and even in consumer-level device tracking (e.g. LoJack® systems). There are also systems, reliant upon second-hand GPS, to track everyday objects like keys or bags. These systems are basically GPS-by-proxy through a GPS enabled device (e.g. a mobile phone) and suffer from the same problems as GPS based systems.

Local positioning systems are generally more limited. These systems rely upon one or more sensors and transmitters to generate a location. Most of these systems include reliance upon GPS to track relative position on an outdoor field. GPS and similar systems generally cannot function within the interior of buildings, so indoor sports facilities are typically not suitable for these types of systems. Even worse, some practice facilities are only used when visiting a given city for a game. Setting those up quickly can be quite difficult.

Today's local positioning systems typically rely upon ultra-wideband systems. For example, product procurement systems such as large product warehouses (e.g. Amazon fulfillment centers) can rely upon these types of systems combined with visual tracking systems. The problem with such systems is that calibration must be precise and as a result, the systems components generally must be fixed and immovable. As a result, calibration is often painful and difficult. Once sensors are installed, an individual or a remote-controlled vehicle must move a responsive radio frequency tag along a precise path to properly calibrate all of the associated UWB anchors. Movement of a single anchor can throw such systems off, and calibration thus takes a significant amount of time and is easily disturbed. In addition, expert installation and calibration are required. For these reasons and a whole host of other reasons, these systems are not ideal for sports practice facilities (which require quick and easy setup and teardown) and are difficult to even re-calibrate in fixed facilities where they remain present at all times such as in indoor arenas or sporting facilities.

An ideal local positioning system (LPS) would enable easy calibration, simple installation, and be easily installable and removable from a given location.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously described element having a reference designator with the same least significant digits.

DETAILED DESCRIPTION

Disclosed herein is a LPS for sports and other facilities that enables rapid deployment in part because the installation and calibration procedures are significantly faster than other similar systems. The present system enables "pop up"

LPSs, for all applications where speed of installation and calibration and, thus, portability are important. This type of system is particularly well-suited for use in indoor sports facilities, but can be combined with traditional GPS-enabled or GPS-assisted outdoor systems for increased accuracy and ease of calibration.

Description of Apparatus

Figure 1:
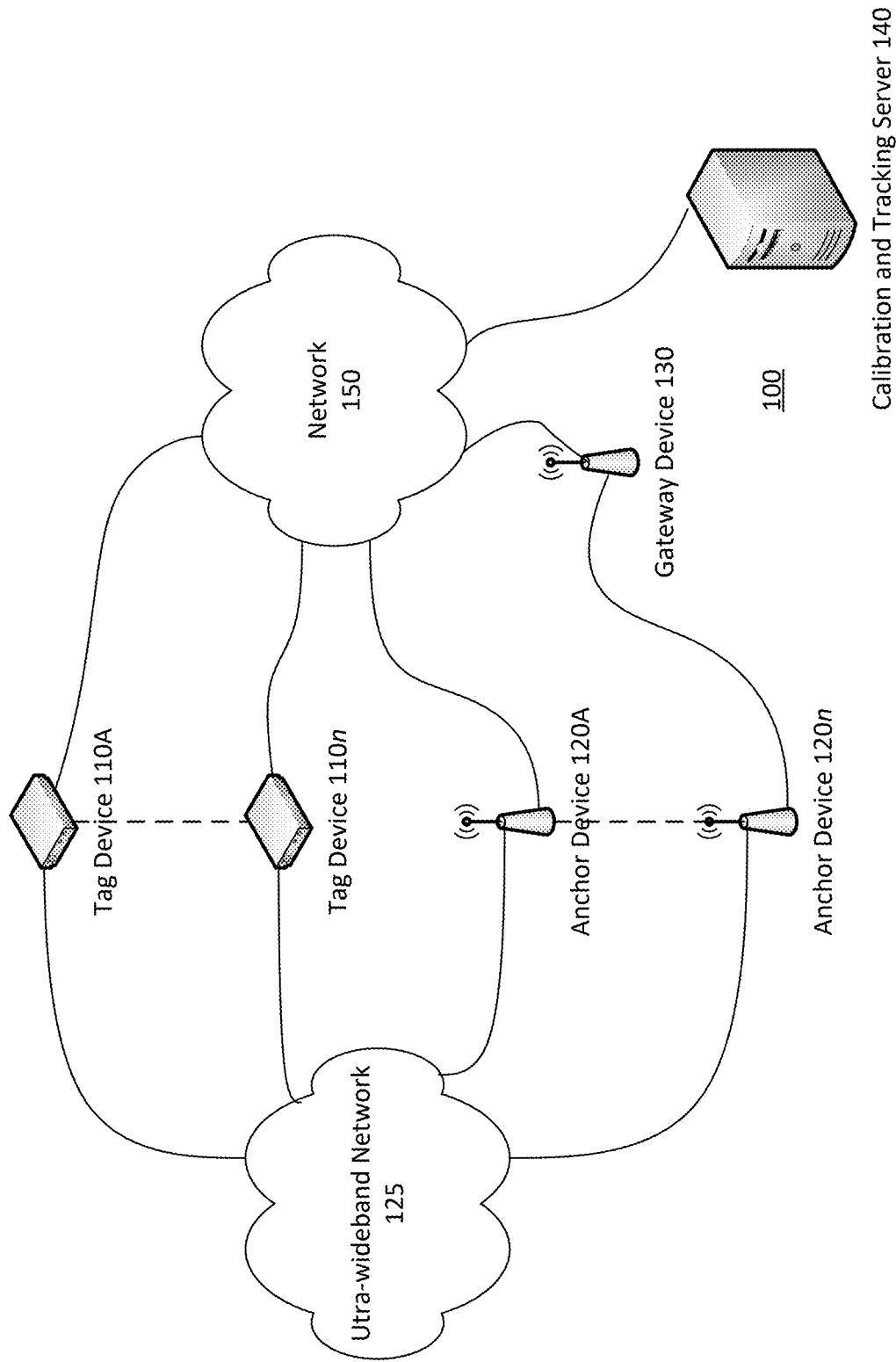
FIG. 1 is an overview of a system for a local positioning.

FIG. 1 is an overview of a system 100 for local positioning. The system 100 includes a tag device 110A, tag device 110n, anchor device 120A, anchor device 120n, a gateway device 130, and a calibration and tracking server 140 interlinked using a network 150. The tag devices 110A-110n and anchor devices 120A-120n are also interlinked with an ultra-wide band network 125.

The tag device 110A is a computing device that operates to provide information regarding location and movement and potentially other data (e.g. linear acceleration, angular velocity, magnetic heading, pulse, speed of transition of movements, height, etc.) to a tracking server like calibration and tracking server 140. This is a conceptual description of the result. In reality, a given tag device 110A measures the distance using two-way ranging using its communications with a plurality of anchor devices 120A-120n. That distance enables the tag device 110A to calculate its position in a properly-calibrated system where the locations of the anchor devices 120A-120n. are known. This will be discussed more fully below, but in concept, it enables the local positioning system to function. In some cases, the ranging functionality of ultra-wideband devices may use two-way ranging to perform calibration, but may fall back to time delay of arrival (e.g. calculating distances based upon time delay of communications between them) following calibration.

The tag device 110A may be affixed to an object, such as a basketball, or may be affixed or worn by a player, such as a basketball player. The tag device 110A differs from the anchor device 120A primarily in that it is intended to act as the object that is tracked, as opposed to a fixed point from which the tracking takes place. Each tag device, like tag device 110A, may bear a unique identifier transmissible in communications, similar to a MAC address, to enable computing devices in communication with tag devices to quickly differentiate each tag device from another.

The tag device 110n is representative of the system 100 including any number of tag devices 110A from 1 to n. Otherwise, tag device 110n is functionally, if not physically, identical to tag device 110A.

The anchor device 120A is a computing device that operates to identify a fixed point within a given space from which location information for one or more tag devices, like tag device 110A, may be derived. The anchor device 120A is fixed in location, once installed and calibrated so as to provide a suitable reference point from which the calibration and tracking server 140 may derive location information for one or more tag devices using two-way-ranging (TWR). The anchor device 120A may be effectively identical, physically and/or functionally, to a tag device like tag device 120A, but may be programmed merely to operate from a fixed position as an anchor device as opposed to from a moving position as a tag device. Like the tag devices, each anchor device, like anchor device 120A, may bear a unique identifier transmissible in communications, similar to a MAC address, to enable computing devices in communication with anchor devices to quickly differentiate each anchor device from another.

The anchor device 120n is representative of the system 100 including any number of anchor devices 120A from 1 to n. Otherwise, anchor device 120n is functionally, if not physically, identical to anchor device 120A.

The ultra-wideband network 125 is used for ultra-wideband communications between the tag devices 110A-110n and anchor devices 120A-120n to enable those devices to directly measure their distance from one another. This process will be discussed more fully below, but the ultra-wideband network 125 is shown as distinct from the network 150 because the tag and anchor devices incorporate multiple network communications protocols and the ultra-wide band network 125 is uniquely used in this situation to enable direct measurement of distances between anchor and tag devices. The network 150, discussed below, is used for sending the majority of data while the ultra-wideband network 125 is used to generate distance and location data.

The gateway device 130 is a computing device that operates to pass two-way ranging information to and from anchor and tag devices. It is functionally identical to an anchor device and/or a tag device. The gateway device 130 also is entirely optional, only necessary in systems where anchors and tags are far from one another or a suitable network connection to transmit location data. The gateway device 130 may also itself act as an anchor or tag device or may be a stand-alone device. One or more gateway devices may be used in a given system 100.

The calibration and tracking server 140 is a computing device that operates to perform the two-way-ranging functions to first calibrate the anchors, as described herein, and then to perform tracking functions for the tags reliant upon the known locations of the anchors within the space or facility. The calibration and tracking server 140 may be nearby the anchor and tag devices, but preferably is cloud-based and available via a network directly in communication with one or more of the anchor devices.

The network 150 is a communications network that enables the devices to communicate. The network 150 relies at least in part upon ultra-wideband (UWB), but also may be or include the internet, Bluetooth®, Bluetooth LE, 802.11x wireless internet or other protocols, some of which may be used for transmission of the associated tracking data to a remote location and/or to the server for review and/or analysis.

Figure 2:
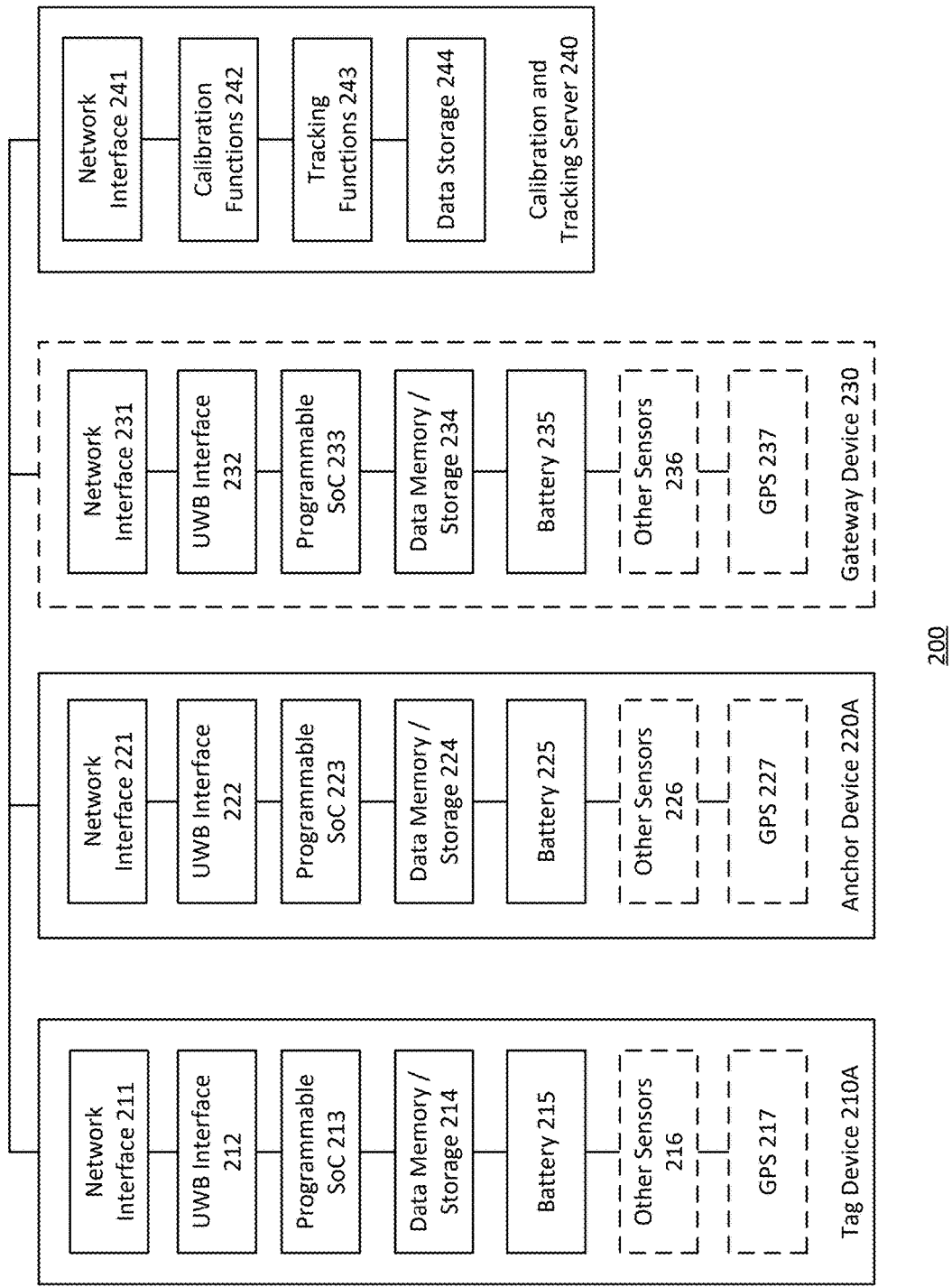
FIG. 2 is a functional diagram of a system for local positioning.

FIG. 2 is a functional diagram of a system 200 for indoor local positioning. The system includes the tag device 210A, the anchor device 220A, the gateway device 230, and the calibration and tracking server 240. These are the same as those shown in FIG. 1. Here, they are shown as functional diagrams in order to discuss their functions and purposes within the overall system 200.

The tag device 210A includes a network interface 211, an ultra-wideband interface 212, a programmable system-on-chip (SoC) 213, data memory/storage 214, battery 215 and may optionally include other sensors 216 and GPS 217.

The network interface 211 is responsible for communications between the tag device 210A and other devices with which it can communicate. The network interface 211 includes typical internet or networking components such as 802.11x wireless networks, Bluetooth®, cellular networks, and the like. Functionally, the network interface 211 sends and receives data, such as the distance data, but also control and calibration data from other anchor devices, gateway devices, and the calibration and tracking server 240. The network interface 211 is the primary communications interface for the components herein for sending distance and measurement and location data, as well as control data.

The ultra-wideband interface 212 is a communications interface designed for ultra-wideband communications.

Typically, the ultra-wideband interface 212 can send and receive ultra-wideband communications signals. This takes place in the present system as well, but those communications are generally short and used primarily for the unique characteristics of ultra-wideband that enable it to be used to directly measure distances between two points using the propagation of the communication itself. The tag device 210A includes such an interface 212 which acts somewhat as simply a sensor in this type of configuration and use, merely "sensing" the distance between other ultra-wideband devices and providing that information to the overall system 200. To accomplish that task, communications do take place, but those are in furtherance of this "sensing" role, much as GPS receivers are described as GPS sensors, though they actually receive a series of timestamps from orbiting satellites and calculate a location using those timestamps. The ultra-wideband interface is used by the tag device 210A to receive many signals and thereafter to calculate a location relative to other ultra-wideband devices. This capability also makes calibration particularly important.

The programmable SoC 213 is a computing device, or a portion of a computing device, that executes instructions held in software to enable the various functions taken on by the tag device 210A. The programmable nature of the programmable SoC 213 means that the tag device 210A is not hardware-bound to perform only one function. Instead, the device 210A may be transformed, through the execution of software, into an anchor device or into a gateway device.

A programmable SoC 213 is traditionally an entire "system-on-chip" meaning that it is or can be wholly self-sufficient and self-contained operating with only the introduction of power. This is a preferred implementation of the tag device 210A, anchor device 220A, and gateway device 230. However, the programmable SoC 213 may be merely a portion of the entire system, being only the processor and/or memory or registers. The overall configuration is somewhat unimportant. The programmable SoC 213 operates as instructed by software, performing the functions required of a tag device 210A, an anchor device 220A, or a gateway device 230. And, that role may be altered based upon a requested software change or "switch."

The data memory/storage 214 stores both the software for enabling the tag device 210A to function as a tag device, and potentially software for enabling it to function as an anchor device and/or gateway, and data generated by the tag device 210A while performing its tracking functions and in calibration. The data memory/storage 214 are preferably a single, solid-state memory device, but may instead be implemented as traditional RAM and hard drive or other non-volatile storage. The phrases "memory" and "storage" as used herein explicitly exclude transitory media such as signals and propagating waveforms.

The battery 215 is used by the tag device 210A to provide power. The tag devices preferably are mobile—moving with players and balls and other objects during a game or practice—and are preferably very tiny. Thus, the battery 215, and preferably the tag device 210A as a whole, must be small enough to not impede motion of the ball and/or player or other objects. The battery may be a watch-style battery or may be a built-in rechargeable battery.

The other sensors 216 are an optional component of the tag device 210A. These other sensors may be or include one or more of inertial measurement unit, accelerometer, gyroscope(s), magnetometer, heart rate sensor, blood oxygen sensor, blood pressure sensor, temperature sensor, air pressure sensor (for balls), a force sensor (e.g. impact force), or other sensors related to a person or an object used in play. These sensors are optional, but may be included in a given tag device 210A to enable the gathering of still more data from the tag device 210A. These sensors 216 may be incorporated into a single physical package with the tag device 210A or may be separately packaged and in communication (e.g. Bluetooth®) with the tag device 210A or other network.

The GPS 217 is likewise optional but is a GPS module responsible for determining a physical location using GPS satellites. It is shown as GPS 217, but it may use a different positioning system or may use multiple systems including assisted GPS reliant in part upon wireless or cellular signals. This may be present, for example, in situations in which it is used to aid the LPS in operation.

The anchor device 220A is functionally identical to the tag device 210A. All of the components, the network interface 221, the ultra-wideband interface 222, the programmable SoC 223, the data memory/storage 224, the battery 225, other sensors 226, and GPS 227 perform the same functions for the anchor device 220A. Their functions will not be repeated. Only the differences or augmentations will be discussed below.

The primary difference between the anchor device 220A and the tag device 210A is that the anchor device operates using software that instructs it to act as a reference point for all of the tag devices in communications with the anchor device. As will be discussed more fully below, the anchor devices are placed in locations and intended to remain in place to provide the suitable reference points, using two-way-ranging, to generate location data for a plurality of tag devices. Thus, the software used by the anchor device 220A instructs it to respond to two-way ranging from tag devices to enable the devices, collectively, to determine their relative locations within the local positioning system. In a preferred implementation, the tag devices calculate the locations of themselves using the relative positions of the fixed anchor devices. In other implementations, the anchor devices may each calculate their own relative locations and store those for later transmission or transmit those to the calibration and tracking server 240 on a delay or in real-time.

The network interface 221 of an anchor device 220A may include or encompass a cellular-based communications system to enable it to communicate with the calibration and tracking server 240. The network interface 221 of an anchor device 220A may include or encompass an ethernet or 802.11x wireless communication system to enable it to communicate with the calibration and tracking server 240.

The anchor device 220A may not rely in whole or in part upon the battery 225. Instead, because anchor devices are generally fixed once calibrated, it may rely upon a fixed electrical circuit from a traditional outlet or other power supply instead or in addition to the battery 225. Alternatively, a larger battery 225 than that included in the tag device 210A may be included. In addition, an anchor device 220A may incorporate power-over-ethernet (PoE) capability and be powered directly by its connection to a network router through an ethernet or similar cable. In other implementations, the anchor device 220A may be powered directly from an outlet or through a universal serial bus (USB) type connector that provides power. Again, this type of connection lowers the overall overhead of installation and movement of anchors for quick roll-out and calibration, particularly in locations that are only temporary (e.g. practice facilities). Whenever connected to a fixed electrical circuit, the anchor device 220A may charge battery 225 to prepare for moments when electrical power may be removed, either intentionally or unintentionally.

The gateway device 230 is functionally identical to the tag device 210A and the anchor device 220A. All of the components, the network interface 231, the ultra-wideband interface 232, the programmable SoC 233, the data memory/storage 234, the battery 235, other sensors 236, and GPS 237 perform the same functions for the gateway device 230A. Their functions will not be repeated. Only the differences or augmentations will be discussed below.

The primary difference between the gateway device 220A and the tag device 210A or anchor device 220A is that the gateway device operates using software that instructs it to act as a gateway for one or more anchor devices or tag devices in communications with the gateway device 220A. The gateway device 230 may be used, for example, where communications from a particular anchor or tag device (or many) to another or to the calibration and tracking server 240 is interrupted or not sufficient. A gateway device 230 may be placed to increase the distance that the signal can travel by acting as a relay or proxy. Simultaneously, the gateway device 230 may act as an anchor and/or tag device or may only act as a gateway device in a given configuration.

The programmable SoC 233 enables the gateway device, including all of the same hardware and functional components, to fulfill a different role within the overall system 200 based only upon changing the software or enabling the "gateway device" functions in the same software.

The ultra-wideband interface 232 may not function if an anchor device is used as a gateway device 230. There may not be any need to measure distances to the gateway device 230. It may exclusively function as a proxy or repeater to transmit data to the calibration and tracking server 240 (e.g. to a network with communication to the calibration and tracking server 240).

The calibration and tracking server 240 is a computing device. It includes a communications interface 241, calibration functions 242, tracking functions 243, and data storage 244. Preferably, the calibration and tracking server 240 is cloud-based, meaning it exists as a server available to a properly configured set of anchor devices and/or tag devices, but need not be "carried" with the users of the system to enable functionality. In some cases, the calibration and tracking server 240 may be brought to a given location or installed at a location (e.g. within a facility).

The network interface 241 is responsible for communications with the tag device 210A, the anchor device 220A and the gateway device 230 using a traditional network protocol or system such as Bluetooth®, 802.11x wireless internet, and similar services. The network interface 241 may also be accessible via the internet to enable purpose-made software and/or a web interface to access the configuration, setup, calibration for, and tracking data generated by a group of tag devices, anchor devices, and gateway devices.

The network interface 241 may operate in real-time as data is generated to receive that data (sent by anchor devices and/or tag devices) to integrate it into an associated tracking dataset for review or analysis by an operator. Or, the network interface 241 may operate to receive that data from the anchor devices and/or tag devices only upon completion of a quarter, period, game or practice session. In such cases, the data may be captured by the anchor devices and/or tag devices and stored. Upon a signal from the calibration and tracking server 240, the anchor devices and/or tag devices may upload the tracking data that they have stored to the calibration and tracking server 240 using the network interface 241.

The calibration functions 242 are software functions executed by the processor of the calibration and tracking server 240 to calibrate a given set of tag devices and anchor devices. The calibration process will be discussed below in more detail with reference to FIG. 10. In short, these functions enable a group of tag devices to be used to set the relative location of a group of anchor devices. Following calibration, after ascertaining the relative location of the anchor devices to the court, field, or other location, the tag devices may be removed while the anchors remain fixed. In this way, the anchor devices may be calibrated relatively quickly and easily.

The calibration functions 242 are shown conceptually here as "within" the calibration and tracking server 240. The calibration and tracking server 240 will have the most computing power and the largest set of data from which to extrapolate and generate both location and tracking data. However, these functions may be present within a given tag device and/or anchor device such that either may generate its own calibration data, much as it generates location and/or tracking data, and later pass that data on to the calibration and tracking server 240. Indeed, anchor devices discussed below automatically begin their own self-calibration process once four ultra-wideband devices are within range and powered on.

The tracking functions 243 are software functions executed by the processor of the calibration and tracking server 240 following calibration to capture location data for a group of tags in communication with the anchor devices. The tracking functions 243 are discussed more fully below with reference to FIG. 11.

The data storage 244 is memory or storage—preferably non-volatile—that stores the calibration and tracking data generated by the system 200, including the tag devices and anchor devices and gateway devices in communication with the calibration and tracking server 240. This data may be maintained in data storage 244 for access using purpose-built software and/or a web-based interface to download tracking data or to use that data or the software to generate detailed analysis of the data for subsequent review.

Figure 3:
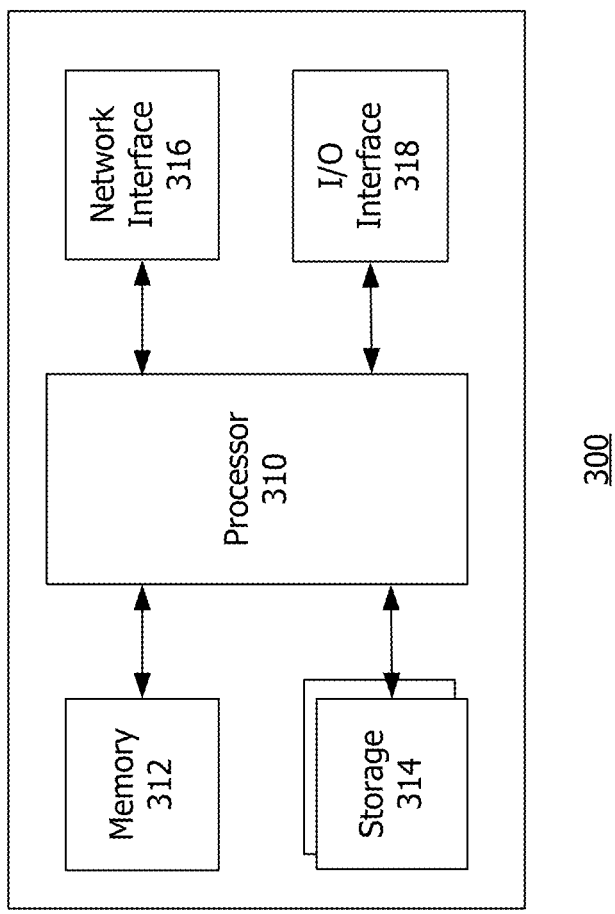
FIG. 3 is a functional diagram of a computing device.

Turning now to FIG. 3, a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 310 coupled to a memory 312, storage 314, a network interface 316 and an I/O interface 318. The processor 310 may be or include one or more microprocessors and application specific integrated circuits (ASICs).

The memory 312 may be or include RAM, ROM, DRAM, SRAM and MRAM, and may include firmware, such as static data or fixed instructions, BIOS, system functions, configuration data, and other routines used during the operation of the computing device 300 and processor 310. The memory 312 also provides a storage area for data and instructions associated with applications and data handled by the processor 310. As used herein, the word memory specifically excludes transitory medium such as signals and propagating waveforms.

The storage 314 may provide non-volatile, bulk or long-term storage of data or instructions in the computing device 300. The storage 314 may take the form of a disk, tape, CD, DVD, SSD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 316 is responsible for communications with external devices using wired and wireless connections reliant upon protocols such as 802.11x, Bluetooth®, Ethernet, satellite communications, and other protocols. The network interface 316 may be or include the internet.

The I/O interface 318 may be or include one or more busses or interfaces for communicating with computer peripherals such as mice, keyboards, cameras, displays, microphones, and the like.

Figure 4:
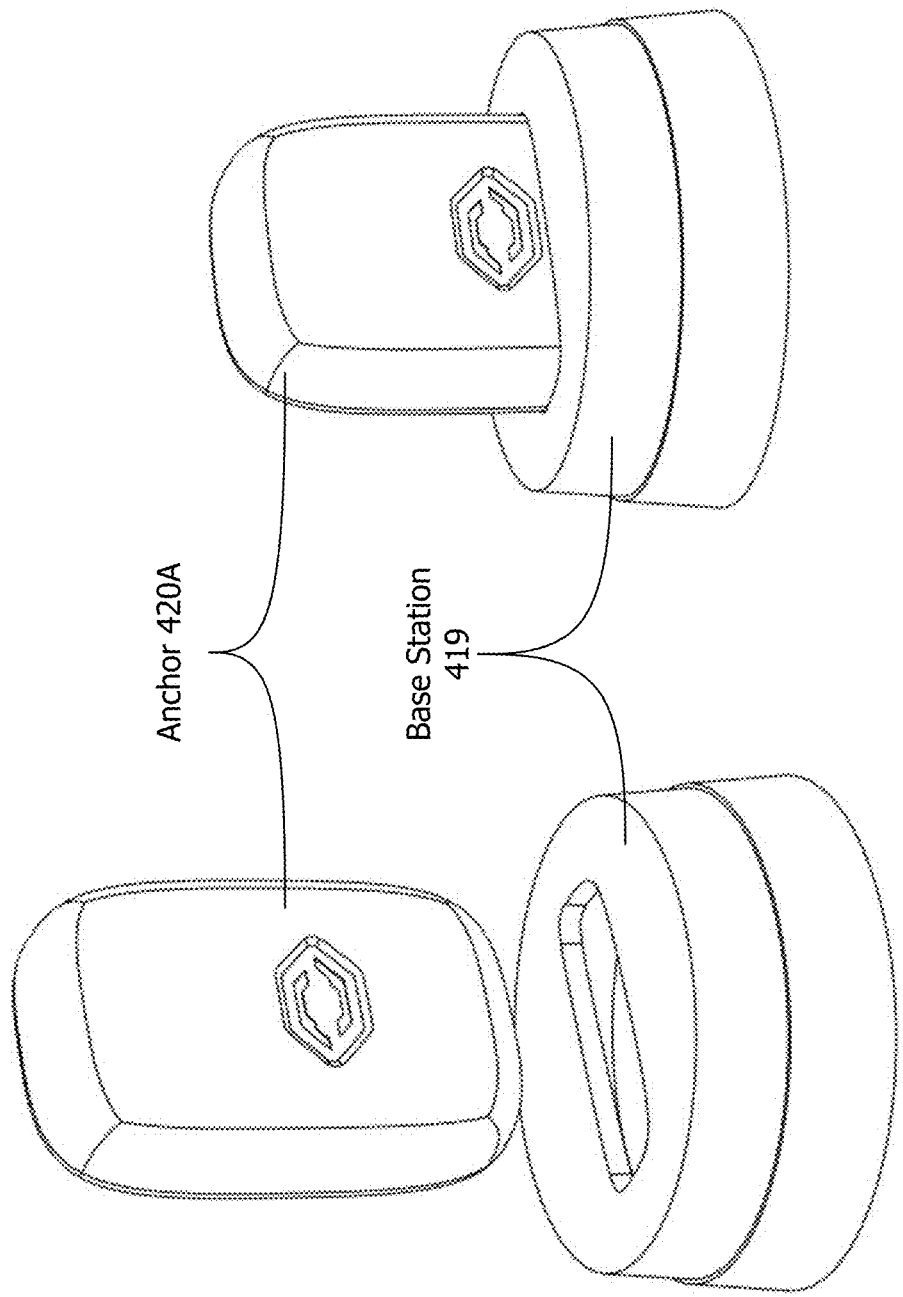
FIG. 4 is an example of a dock and charging system for an anchor or tag.

FIG. 4 is an example of a dock and charging system for an anchor or tag. The base station 419 is shown with the anchor 420A inserted therewithin. The anchor 420A may merely be a tag that is operating as an anchor 420A because it is being set within a fixed base. Or, the base station 419 may act as a charging dock to charge the battery of the anchor 420A (or tag) so that it may be removed thereafter and used as a tag or gateway device.

In addition, this dock enables a given tag device's antenna to be elevated for better reception and transmission of data through an integrated antenna. In some embodiments, the tag's enclosure may feature rounded corners to prevent and/or mitigate potential injuries during use while a player is wearing the devices while engaged in full-contact sports. In such implementations, during calibration, the tag device may not sit up-right, but rather lay flat on the floor due to the rounded nature of the enclosure. In this situation, the dock may assist in orienting the tag in the optimal orientation to maximize antenna reception and characteristics which could impact the calibration process.

Figure 5:
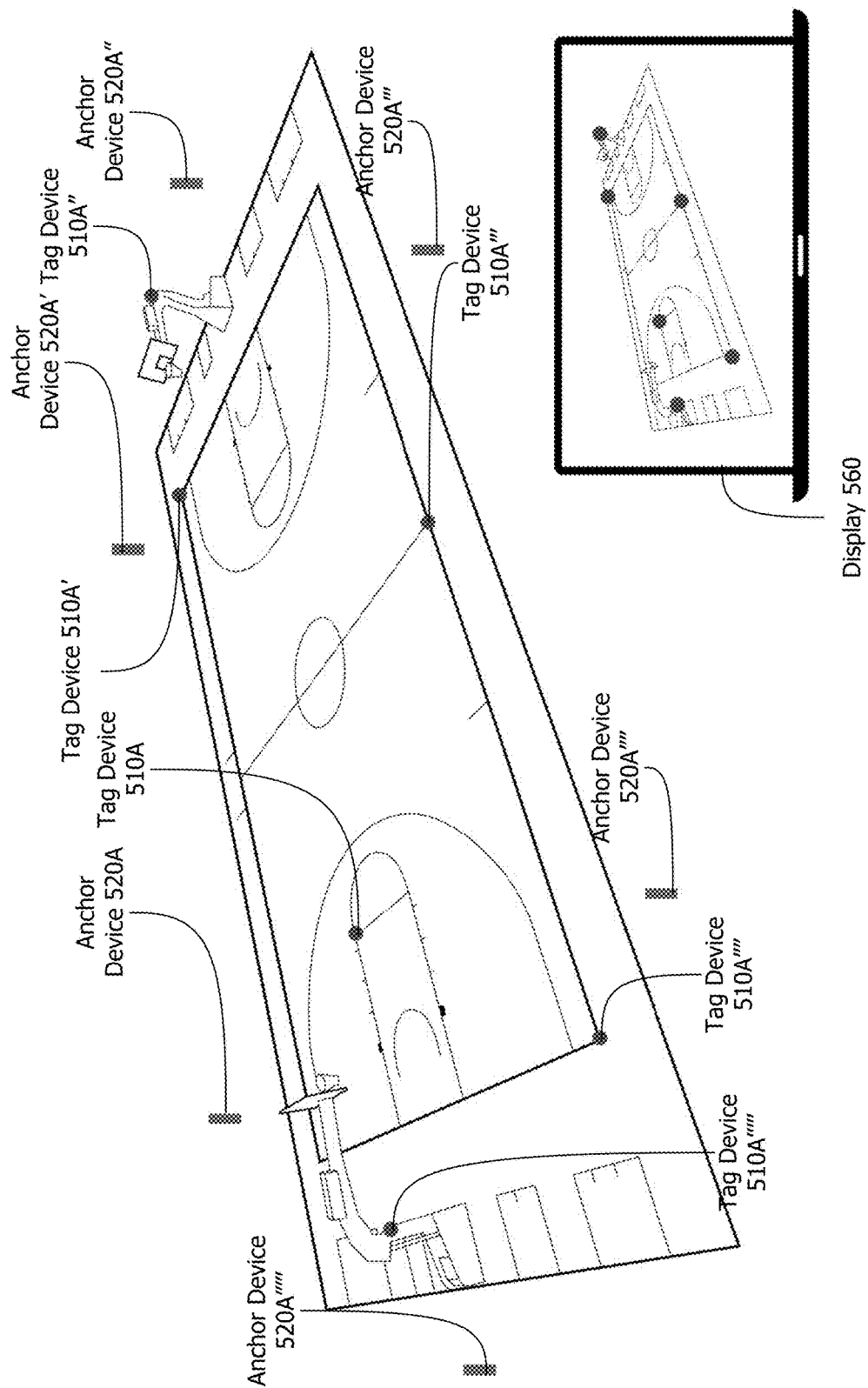
FIG. 5 is an example court that may be used with a local positioning system.

FIG. 5 is an example court that may be used with an local positioning system. The system operates on a traditional basketball court with a series of anchors 520A-520A"" are shown. Likewise, tag devices 510A-510A"" are present. This figure will be discussed more fully with reference to FIG. 10 below. In general, the anchor devices 520A-520A"" act as fixed points from which the locations of moving tags on the basketball court may be derived once calibration is complete. As shown in FIG. 5, calibration is in process. The display 560 may show the locations of the tag devices 510A-510A"". This may hold true during calibration (as shown), but also during use of tag devices to track players on the court.

Figure 6:
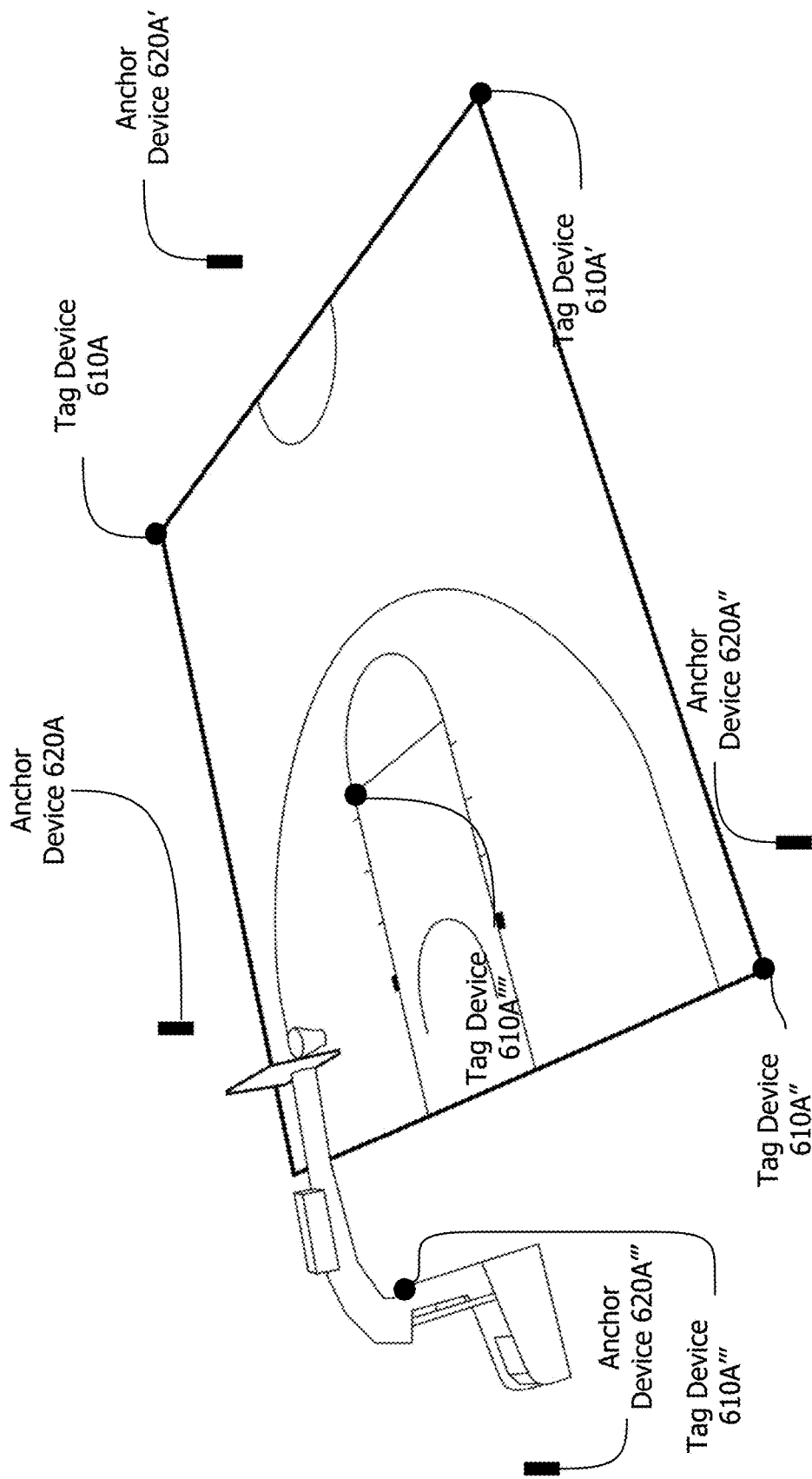
FIG. 6 is an example half-court that may be used with a local positioning system.

FIG. 6 is an example half-court that may be used with an local positioning system. This court likewise has a plurality of tag devices 610A-610A"" and a plurality of anchor devices 620A-620A"". The anchor and tag devices can operate on any size field, court or other interior space. The number of anchors necessary to adequately cover a given space may vary from a few to many. And, the anchor devices 620A-620A"" are shown in various locations around the half-court. Preferably some of those locations are above or below the plane of the court itself. This enables the two-way-ranging system used to track tags to adequately differentiate from devices above or below (e.g. below the court) the plane of the court. If all anchors are planar, then tracking in the "z" dimension of an x,y,z coordinate system) has two accurate resolutions, both above and below the plane of the anchor devices.

Figure 7:
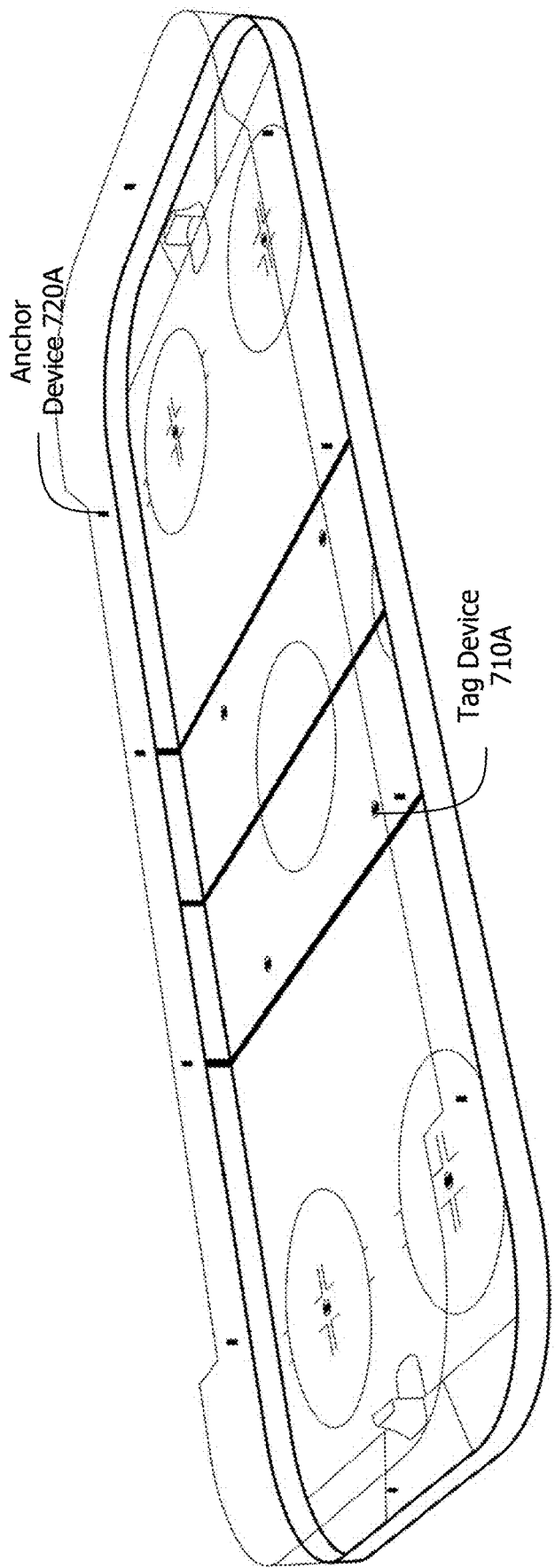
FIG. 7 is an example ice rink that may be used with a local positioning system.

FIG. 7 is an example ice rink that may be used with an indoor local positioning system. The rink has a series of tag devices and anchor devices. As shown, the anchor devices may be integrated into the rink itself to ensure that they all remain relatively fixed. Only anchor device 720A is shown, but a series of anchor devices may encircle the rink. Tag devices, like tag device 710A may be embedded into a puck, attached to equipment, or attached to people on the ice rink.

The tag devices, like tag device 710A may be placed at predetermined positions within the facility during calibration, and then removed for play.

Figure 8:
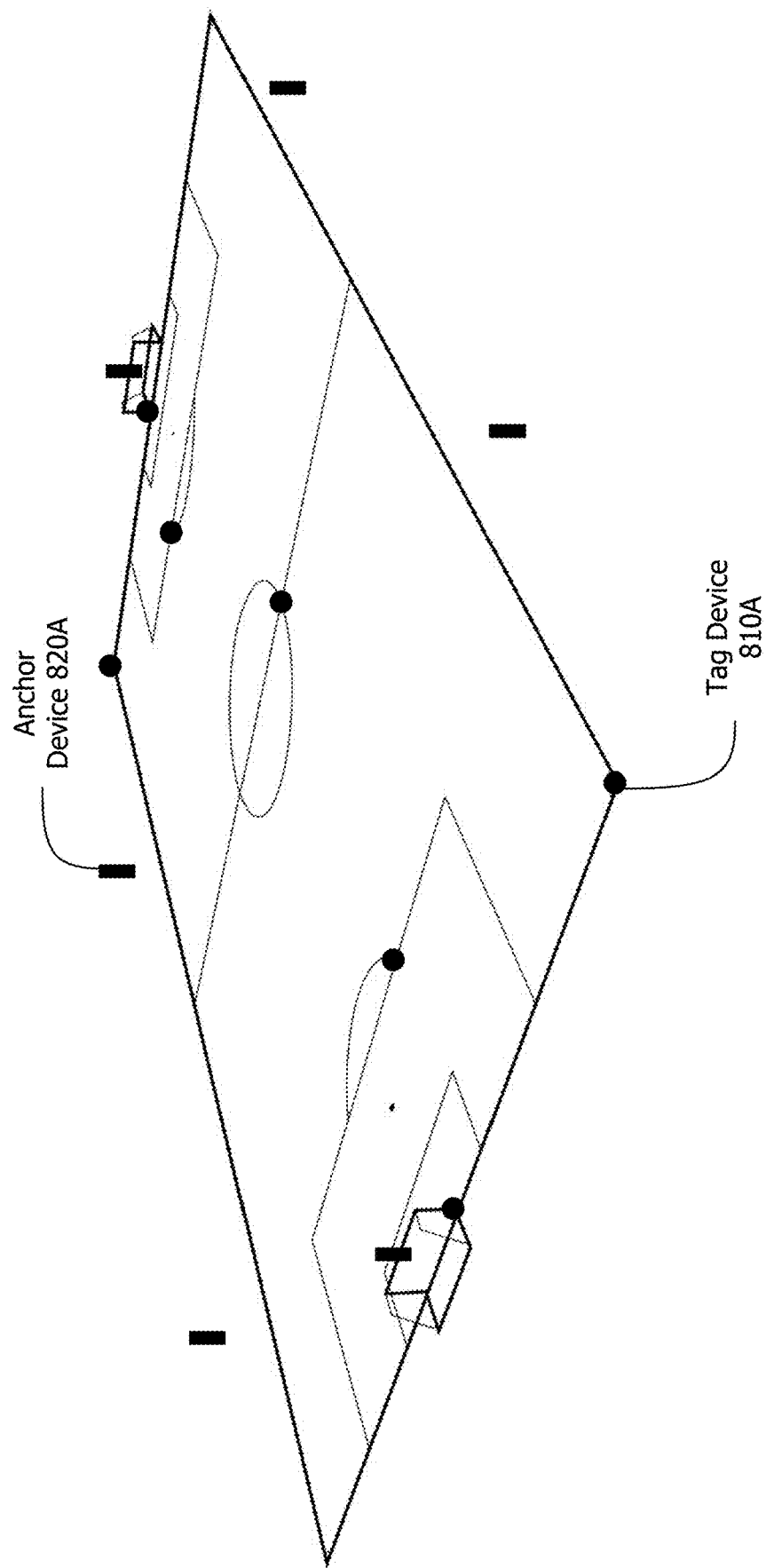
FIG. 8 is an example soccer field that may be used with a local positioning system.

FIG. 8 is an example soccer field that may be used with an local positioning system. As above, there are a plurality of tag and anchor devices, like tag device 810A and anchor device 820A within the facility.

Figure 9:
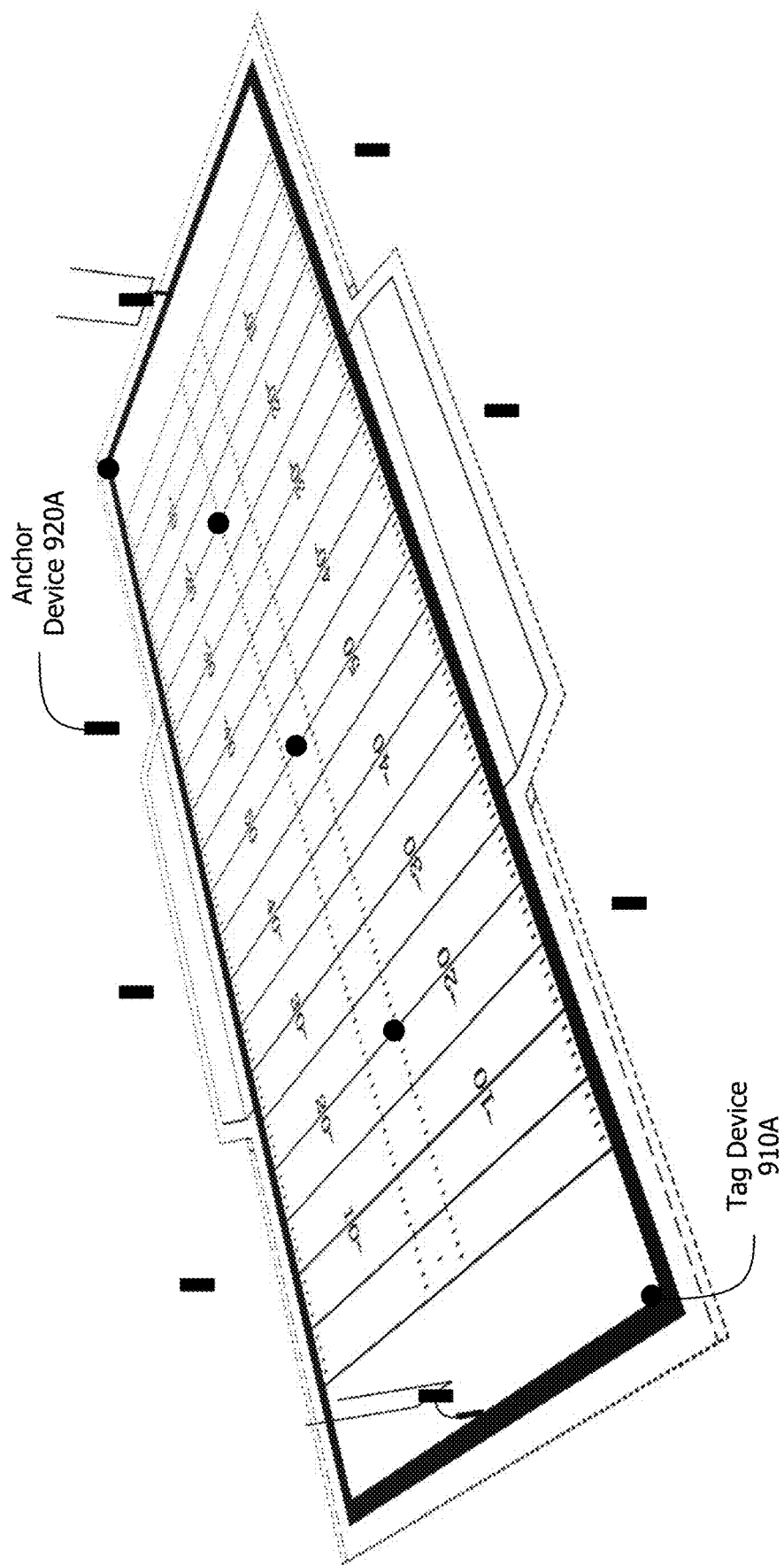
FIG. 9 is an example football field that may be used with a local positioning system.

FIG. 9 is an example football field that may be used with an local positioning system. As above, there are a plurality of tag and anchor devices, like tag device 910A and anchor device 920A within the facility.

Figure 10:
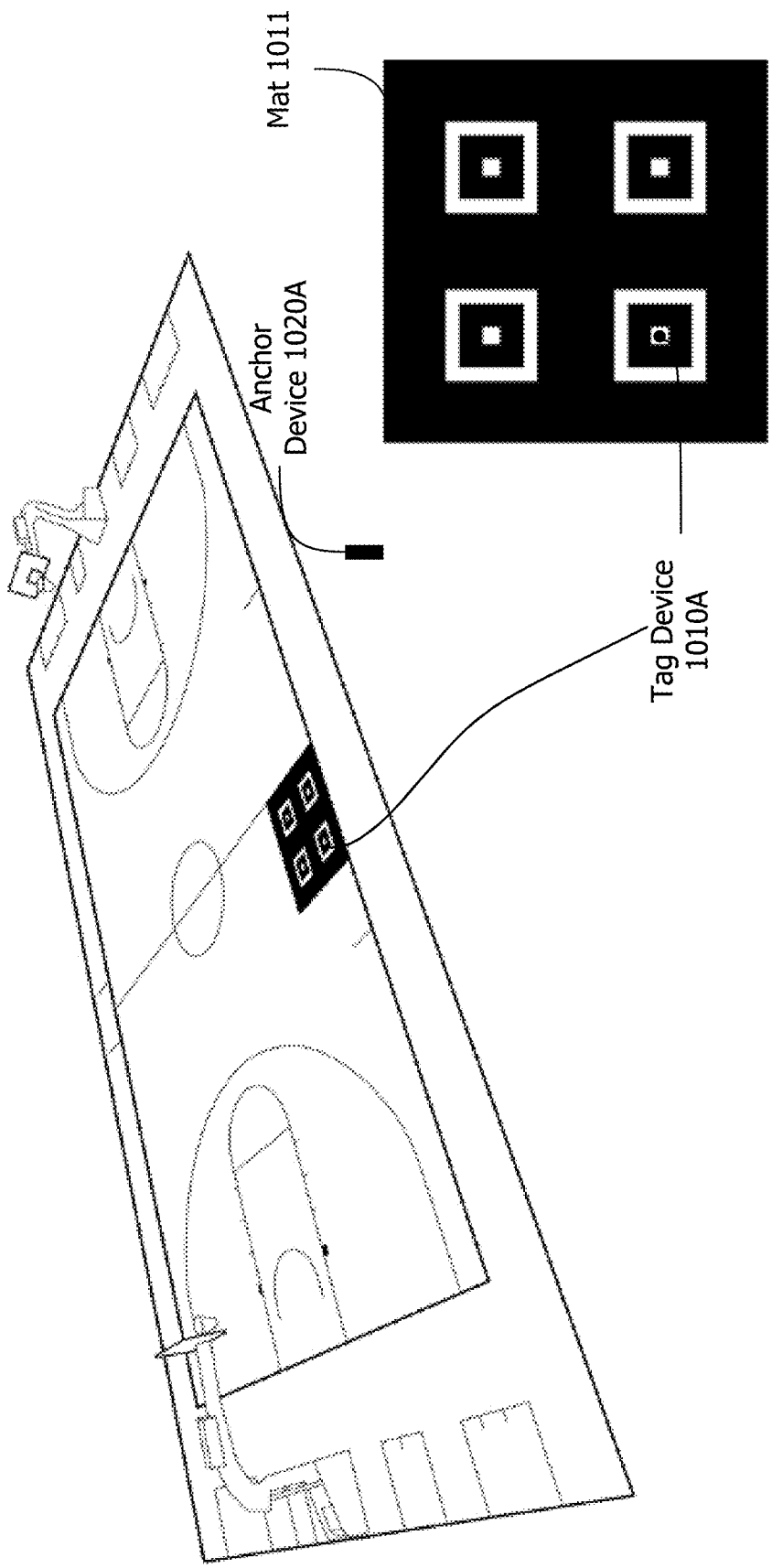
FIG. 10 is an example court that may be used with a local positioning system.

FIG. 10 is an example court that may be used with a local positioning system. Much as with the other facilities shown in FIGS. 4-9, the anchor device 1020A may be set in a series of fixed locations relative to the court. However, in order to calibrate the anchor devices, like anchor device 1020A, particularly in a court or field or area that may have somewhat irregular characteristics, a mat 1011 or similar object may be used. The characteristics of the mat 1011 may be known and tag devices like tag device 1010A may be placed at known locations on the mat 1011 for calibration purposes. The ultra-wideband calibration may rely upon these known characteristics to calibrate, then the mat 1011 may be removed for play or practice. The mat 1011 may be movable, light, and easily removable. In some cases, the mat 1011 may be built into a given field or court and remain after calibration. A set of tag devices that are joined (e.g. by a series of braces or links) or otherwise automatically set at a fixed distance from one another and used for calibration may be substituted for and used in much the same way as a mat. Any way in which the relative locations of the set of tag devices may be set in predetermined locations relative to a given court, field, or other playing surface would potentially substitute.

Description of Processes

Figure 11:
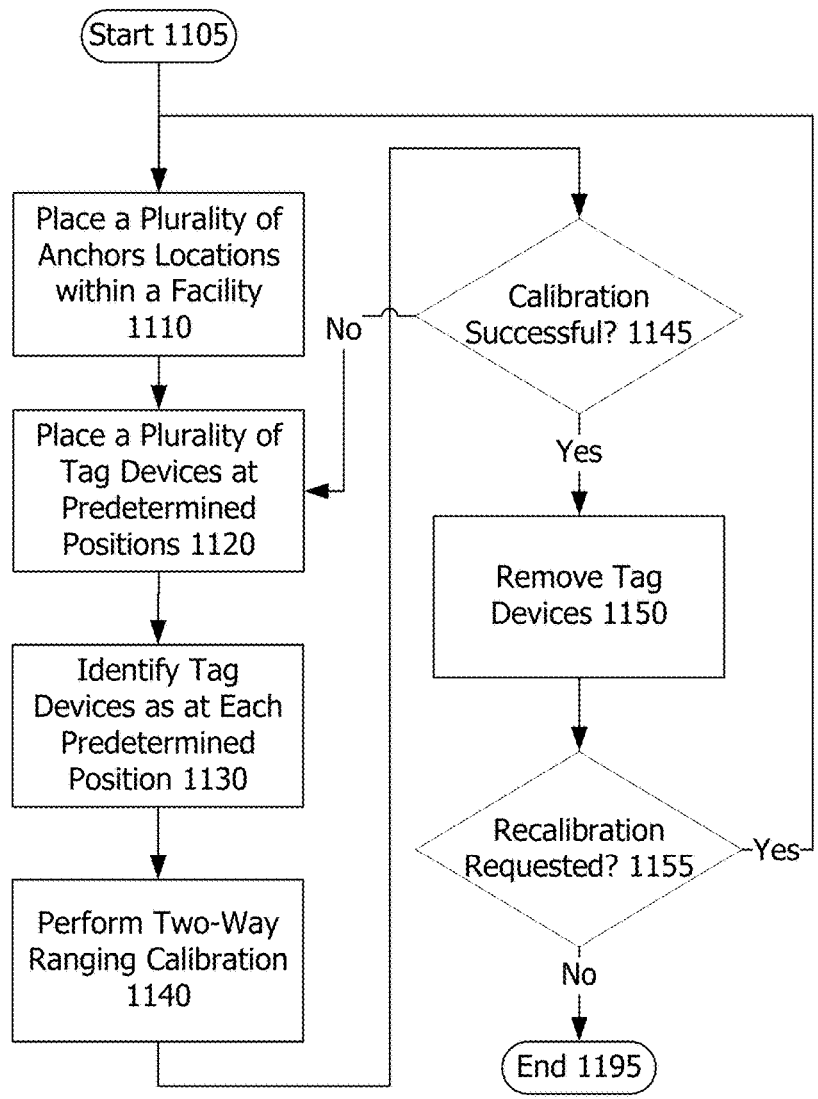
FIG. 11 a flowchart of a process of calibration of a plurality of anchors and tags within a facility.

FIG. 11 a flowchart of a process of calibration of a plurality of anchors and tags within a facility. The process has a start 1105 and an end 1195 and may take place many times or each time a recalibration need take place or each time the overall system is moved from one facility to another facility. Reference is also made to FIG. 5 within this description.

Following the start 1105, the process begins with placement of a plurality of anchor devices within a facility at 1110. Each anchor device has a unique identification number associated with it. In a preferred embodiment, these unique ids are similar to MAC addresses used in internet routing. And, though step 1110 is shown as placing the anchor devices in locations around a facility, steps 1110 and 1120 maybe reversed without any change in the functionality of the system.

These anchor devices are placed in locations around a facility (e.g. a basketball court, an indoor soccer stadium, etc.) where they are intended to remain for the duration of the tracking process. Typically, these locations will be within or on top of walls surrounding the facility, but they may be built into the floor of the facility, the wall of the facility or the ceiling of the facility, or within objects in the facility (e.g. a backboard, goal, or other object). The anchors may be placed so that they have continuous electrical power, rather than be reliant upon internal batteries, or may incorporate both.

So, for example in FIG. 5, the anchor devices 520A-520A"" are shown at locations around the basketball court and at various heights relative to the plane of the court.

Returning to FIG. 11, the process continues with placement of a plurality of tags at predetermined positions within the facility at 1120. This is an important portion of the calibration process. Specifically, sports facilities share certain characteristics. The basketball hoop is 10 feet off the floor. The court is 94 feet long, 50 feet wide. The free-throw line is 19 feet from the baseline or 15 feet from the back of the hoop. These characteristics are identical in basketball courts throughout the world and in competitive conferences such as collegiate basketball and professional basketball. The same is true for the dimensions of indoor soccer facilities, indoor football (or Canadian rules football) facilities, and virtually any other sporting facility.

These measurements for a given facility, such as a basketball court, a soccer field, a football field (of various rules), and the like are rigorously enforced, set by rule or regulation, and are uniquely uniform across a given sport no matter the location. So, within some very reasonable tolerances, soccer fields within a given league (e.g. collegiate and pro) have identical characteristics. Likewise, all professional basketball courts or professional hockey rinks have identical court/rink markings, sizes, and characteristics. So, while ultra-wideband systems typically require a very precise and complicated calibration process, the uniformity and accuracy of these sports facilities themselves can be leveraged to enable a much simpler calibration process.

Accordingly, as used herein, the phrase "predetermined position" means a location within a given facility set by rule or regulation or an offset based upon such a location. So, center court in a professional basketball court would be a "predetermined position." Likewise, three feet left of center court would be an offset of such a location and, itself, a "predetermined position." In soccer, all field markings would be "predetermined positions." The height of the goal, and its width are set by regulation as well. So, the top, left corner of a soccer goalpost likewise would be a "predetermined position" as used herein.

This predetermined position information for a given sport can be used as a surrogate for the complicated and detailed calibration processes that would otherwise be required for a given facility. The tag devices at known locations having well-known and fixed characteristics enable the easily-movable tag devices to temporarily function as anchor devices from which the other anchor devices can ascertain their relative positions. This enables the tag devices to function to "boot strap" the fixed anchor devices without the need for precise measurements, robots, or careful hand-held calibration processes. Thereafter, the tag devices can be removed (at 1150, discussed below).

Referring again to FIG. 5, the anchor devices 510A-510A"" maybe placed at predetermined positions within the facility reliant upon the relative dimensions already known based upon the rule or regulation standardization for facilities of a given type.

In FIG. 5, tag device 510A is placed at one corner of the free throw line. Tag device 510A' is placed at a corner of a baseline, while 510A"" is placed at an opposite corner baseline. Tag device 510A''' is placed at midcourt along one side. Tag devices 510A" and 510A"" are placed at a known height and location on the goal itself. It is shown as a portion of the supporting arm, but the tag may be placed on the edge of the hoop, the bottom of the backboard, or other known location relative to the rest of the court. The display 560 shows those locations—and may be used to quickly instruct an individual operating the calibration procedure of the location to place the tag devices 510A-510A"". In this way, only a few tag devices need be placed in predetermined positions around the facility to complete the calibration procedure for the anchor devices 520A-510A"".

Though discussed in 1120 as placement of a plurality of tag devices at predetermined positions, an individual tag device could be used over-and-over by placing the tag device at a predetermined position, performing a first calibration step, then moving the tag device to a new predetermined position, performing a second calibration step and so on. This is the same process in multiple steps, but is intended to fall within the scope of the present patent.

Returning to FIG. 11, the next step is to identify tags as set at each predetermined position 1130. This may involve instruction as to where to place the tags as shown on display 560. In some cases, a user may instruct the calibration software itself of the locations where the tags have been placed. Or, the locations may be fixed, requiring the user to always place the tags in a set of predetermined positions and to merely confirm, at 1130, that the tags have been placed at those locations within the facility.

Continuing with FIG. 11, the system then performs the two-way-ranging calibration at 1140. This process relies upon each anchor device (operating temporarily as tags) taking turns to directly measure its distance from a given tag device (operating as a temporary anchor in a predetermined position) using ultra-wideband. One characteristic of ultra-wideband is that it maintains its integrity and structure—even in the presence of noise and multi-path effects—very accurately. Thus, its rate of travel within its effective range is extremely constant. As a result, its signals are extremely useful in that it can be transmitted and the time of flight itself provides a measure of distance. In short, one need only multiply the time of flight by the speed of light—the travel speed of ultra-wideband transmissions—to obtain the exact distance between the two points.

Because the predetermined positions where the tag device are known distances apart, the tag devices can be used as temporary anchors in the sense that they are already known to be at those predetermined positions relative to the court of play, field, or the like. Once the independently placed anchors (operating temporarily as tags) generate their positions relative to those tag devices (operating as temporary anchors), the tag devices can be removed and the anchor devices can maintain the integrity of their relative positions to the court, field, or the like. In this way, the relative locations of the anchor devices are bootstrapped using those predetermined positions of the tag devices.

Though shown as an affirmative step in the process, the process of two-way-ranging calibration at 1040 may begin automatically once there are a sufficient number of anchor devices placed and able to communicate with each other. In a preferred case, this number is four devices (at least three forming a plane, at least one above or below that plane), but more or as few as three can and may be used. The system may compensate for results indicating that a player is, for example, under the plane of the basketball court by eliminating nonsensical tracking results. And, if an anchor device is moved or removed and another replaced, the anchor devices will automatically begin re-calibration in an effort to self-heal by determining the new location of the moved anchor device or the location of the new anchor device. This helps the system to be resilient to minor issues.

One requirement is that under a two-way-ranging technique, it is preferable to have each tag device "take turns" sending their signals so as to not interfere with one another. The overall process ultra-wideband ranging processes for calibration undertaken by a group of tag devices may be coordinated over the course of seconds so as to not interfere with one another. A typical ultra-wideband communication process of this type may be on the order of 100 ms, so the overall process can take place extremely quickly.

Identification data for a given tag and/or anchor may be transmitted along with the UWB communication that uniquely identifies each tag device (e.g. a tag number, serial number, or the like). In general, the requirement for communications between the tag devices and anchor devices to measure the travel distance from each tag to each anchor may require more power to complete. As a result, calibration tag devices or two-way-ranging tags generally, may be larger with larger batteries than other types of tags (e.g. time difference of arrival tags). Specific "calibration tag devices" may be used with larger batteries and potentially additional functions but that would be too large or otherwise unsuitable for use in performing tracking functions following calibration. Or, all tag devices may be the same.

Once each tag device has performed its two-way-ranging function with the anchor devices (operating temporarily as tag devices) or with already calibrated anchor devices, a plurality of known distances—in conjunction with the predetermined locations (and their relative distances) where those tag devices (operating temporarily as anchor devices) have been placed and their relative locations on the field, court, or the like—enables the system to easily calculate the exact location of each anchor device, no matter where it has been placed within the facility.

A determination may be made at 1145 whether the calibration was successful. If not ("no" at 1145), then the process may return to placement of the plurality of tags at predetermined positions at 1120. This may be, for example, because the tags were placed at an incorrect position or there were not enough tags placed. Other calibration issues can also arise.

If so ("yes" at 1145), then the tag devices may be removed at 1150. Those tags 510A-510A'''' were only used for calibration purposes. They need not remain once the precise locations of the anchor devices 520A-520A'''' are known.

If recalibration is desired for any reason ("yes" at 1155), the process may continue at step 1110 with re-placement of a plurality of locations within a facility. If it is not necessary ("no at 1155), then the process may then end at 1195.

Figure 12:
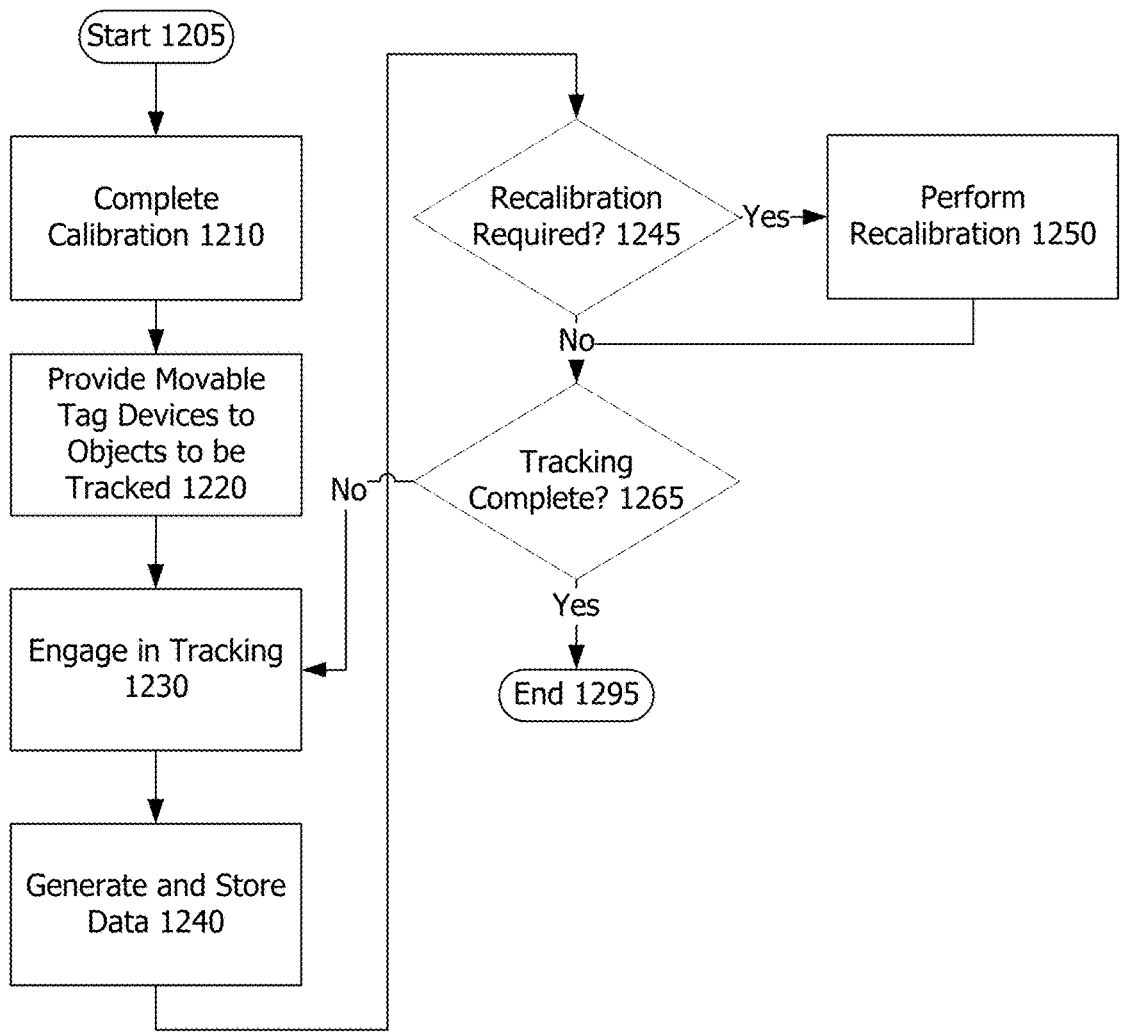
FIG. 12 is a flowchart of a process for use of a plurality of calibrated anchors to track tags within a facility.

FIG. 12 is a flowchart of a process for use of a plurality of calibrated anchor devices to track tag devices within a facility. The process has a start 1205 and an end 1295 and may take place many times or each time tracking is desired within a facility or may continue until tracking within a facility is complete.

After the start at 1205, the process begins with completion of calibration at 1210. This calibration is described with reference to FIG. 11 above. Once that process is complete, a plurality of movable tags may be given to objects (or people) to be tracked using the system at 1220.

Next, the tag devices that are intended to be tracked by the system (e.g. player tag devices, ball tag devices, etc.) are provided to the objects (or humans) to be tracked at 1220. Preferably, these tag devices will be small enough that they are unobtrusive to the overall play of the game or sport, do not inhibit player movement or otherwise interfere with players, and will not alter the flight of any ball or other object (e.g. glove or pads) used in a game or practice. These tags may be integrated into jerseys, pads, a ball, a net, or may otherwise be integrated in as seamless a manner as possible. And, as time goes on, the components, power needs, and other elements will tend to grow smaller, thereby enabling the tag devices to become smaller and smaller as well.

Next, the system engages in tracking at 1230. The tag devices periodically report their position to the anchor devices which in turn provide that data to an associated calibration and data server. In this way, because the positions of all of the anchor devices are now known, the tags may be tracked with as quick or slow a refresh rate as desired. For most sports, movement is quick and ongoing, so rapid refreshment of each tag during the tracking will take place, on the order of once per 100 milliseconds or once per $\frac{1}{10}^{th}$ of a second. The only limitation is the ability of a power supply (e.g. a battery) to continue to provide those updates as rapidly as desired throughout the practice or game.

In an example case, there may be a limit on the total number of samples across all tags being tracked that may be captured within a given time-frame (e.g. 150 samples within one second). In particularly fast-moving sports or sports with many players, it may be necessary to allocate those total samples intelligently across all of those players or trackers (e.g. on the ball). To accomplish this, the sampling rate for the tracking may dynamically change to match the speed of movement of an object or a person. The sampling may take place rapidly during bursts activity and slowly during inactivity. For example, for an athlete that is idle on the sideline, the sampling rate may be throttled to once per second, while an athlete that is sprinting may have their position sampled at the maximum rate allowed by the system. A tag's on board sensors may assist in determining the sampling rate. For example, the ultrawide band measurements over time provide speed, and depending on the measured speed, the tag may increase or decrease the sampling rate.

In another example, the location may be used to determine the sampling rate. For example, players actively in the play area may have higher sampling rates, while players on the sideline may have lower sampling rates or may have tracking entirely disabled. In other embodiments, an onboard accelerometer may sense accelerations and use this information to increase or decrease the sampling rate. In yet other embodiments, the calibration and tracking server may assist in providing the desired sampling rate to each tag. As the calibration and tracking server has global understanding of all devices, it may allocate samples to tags. Depending on the implementation, there may only be so many samples that can be taken in a given set of time. In two-way ranging applications, this type of scheme may be preferable as there may be a predefined upper-bound on the total number of positional samples defined by the protocol, and such a scheme may assist optimally allocating position samples to those athletes or objects which are moving the most (or at all) or for which rapid sampling is important while other objects are adequate with only very slow sampling (relatively speaking).

The tracking may also rely upon two-way-ranging. As discussed above, the time of flight of an ultra-wideband transmission can be used to very accurately determine a location of a given tag device. Again, using trilateration of a plurality of anchor devices on a given tag, the precise location of the tag device may be ascertained with a significant degree of certainty.

As the tracking goes on or potentially once the tracking is complete (e.g. the game or practice is over), the data is generated and stored at 1240. This process may take place in real time, captured by the anchor devices as the tag devices perform two-way ranging or the tag devices themselves (or anchor devices) may store that data as it is generated and it may remain stored locally until the game or practice is over, or until a given quarter, period, half or other portion of time is completed. Thereafter, the data may be uploaded to the calibration and tracking server. Preferably, the data is provided by the anchor devices and tag devices in real-time so as to enable near-immediate review or replay of the tracking of the players and/or ball and/or other objects pertaining to the practice or game. In such a case, the data may only be temporarily stored on the anchor and/or tag devices, and may be stored on the calibration and tracking server in a database.

At 1245, a determination is made whether recalibration is required. In some cases, the anchor devices may be bumped or intentionally moved. In such a case, recalibration may be required. Or, the anchor devices may be moved from one practice facility to another. In such cases and others, recalibration may be required ("yes" at 1245). If so, a recalibration is performed at 1250 which is much like the calibration procedure at 1210.

If not ("no" at 1245), then a determination is done whether tracking is complete at 1265. This may take place when the practice is over, the game is over, or tracking is no longer desired. A prompt may be provided to an operator of the system upon determination that the majority of the tag devices have not moved for a predetermined period of time. Or, it may be prompted by an affirmative request from an operator.

If tracking is not complete ("no" at 1265), then the process continues with further engagement in tracking at 1230. If the tracking is complete, then the process may then end at 1295.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A local positioning system comprising:
    a plurality of anchors placed within a facility, the anchors intended to be left in position following calibration;
    a plurality of calibration tags, placed at predetermined positions relative to a space having parameters of known dimensions within the facility;
    a calibration server for:
        instructing the plurality of anchors and the plurality of calibration tags to engage in a calibration procedure reliant upon ultrawide band communications;
        using the predetermined positions of the plurality of movable tags to determine a placement of each of the plurality of anchors; and
        storing the placement of each of the plurality of anchors, thereby completing the calibration procedure, to enable tracking movement of a subsequent set of movable tags within the facility,
    wherein the calibration server is further for:
        instructing the plurality of anchors and the plurality of calibration tags to engage in a recalibration procedure;
        using the predetermined positions of the plurality of calibration tags to determine an updated placement of each of the plurality of anchors; and
        storing the updated placement of each of the plurality of anchors, thereby completing the recalibration procedure, to enable tracking movement of the subsequent set of movable tags within the facility.

2. The local positioning system of claim 1 wherein the plurality of calibration tags are removed following the calibration procedure while the plurality of anchors remain.

3. The local positioning system of claim 1 wherein the plurality of anchors are in locations both on the plane of a playing area making up the space and a selected one of above or below the plane.

4. The local positioning system of claim 1 wherein a playing area is a basketball court, a hockey rink, in indoor football stadium, a tennis court, a volleyball court, a ping pong table, or other indoor sports facility, and further wherein the predetermined positions relative to the space are predetermined points on the playing area.

5. The local positioning system of claim 1 wherein the anchors and the tags rely upon two-way-ranging to perform the calibration procedure.

6. The local positioning system of claim 1 wherein the plurality of calibration tags are a subset of the plurality of movable tags.

7. Apparatus comprising a non-volatile machine-readable medium storing a program having instructions which when executed by a processor will cause the processor to:
    communicate with a plurality of anchors placed within a facility, the anchors in fixed positions following a calibration procedure reliant upon ultrawide band communications and with a plurality of movable tags, attached to individuals and/or objects used to play a sport within the facility; and
    using the plurality of anchors, in two-way-ranging communication with the plurality of movable tags, to track movement of the plurality of movable tags within the facility;
    communicate with a plurality of calibration tags, placed at predetermined positions relative to a space having parameters of known dimensions within the facility;

use the predetermined positions of the plurality of calibration tags to determine a placement of each of the plurality of anchors; and store the placement of each of the plurality of anchors, thereby completing the calibration procedure, to enable tracking movement of a subsequent set of movable tags within the facility, wherein the instructions further cause the processor to perform a recalibration procedure comprising:

using the predetermined positions of the plurality of calibration tags to determine an updated placement of each of the plurality of anchors; and storing the updated placement of each of the plurality of anchors, thereby completing the recalibration procedure, to enable tracking movement of the subsequent set of movable tags within the facility.

8. The apparatus of claim 7 wherein the plurality of calibration tags are removed following the calibration procedure while the plurality of anchors remain.

9. The apparatus of claim 7 wherein a playing area is a basketball court, a hockey rink, in indoor football stadium, a tennis court, a volleyball court, a ping pong table, or other indoor sports facility, and further wherein the predetermined positions relative to the space are predetermined points relative to the playing area.

10. The apparatus of claim 7 wherein the plurality of anchors are in locations both on a plane of a playing area making up the space and a selected one of above or below the plane.

11. The apparatus of claim 7 wherein the instructions further cause the processor to convert a selected one of the plurality of anchors into one of the plurality of tags or one of the plurality of tags into one of the plurality of anchors.

12. The apparatus of claim 7 further including a computing device comprising:

the processor a memory wherein the processor and the memory comprise circuits and software for performing the instructions on the storage medium.

13. The apparatus of claim 7 wherein the plurality of calibration tags are a subset of the plurality of movable tags.

14. Apparatus comprising a non-volatile machine-readable medium storing a program having instructions which when executed by a processor will cause the processor to:

communicate with a plurality of anchors placed within a facility, the anchors in fixed positions following a calibration procedure reliant upon ultrawide band communications and with a plurality of movable tags, attached to individuals and/or objects used to play a sport within the facility; and using the plurality of anchors, in two-way-ranging communication with the plurality of movable tags, to track movement of the plurality of movable tags within the facility;

communicate with a plurality of calibration tags, placed at predetermined positions relative to a space having parameters of known dimensions within the facility;

use the predetermined positions of the plurality of calibration tags to determine a placement of each of the plurality of anchors; and store the placement of each of the plurality of anchors, thereby completing the calibration procedure, to enable tracking movement of a subsequent set of movable tags within the facility, wherein the instructions further cause the processor to convert a selected one of the plurality of anchors into one of the plurality of tags or one of the plurality of tags into one of the plurality of anchors.

15. The apparatus of claim 14 wherein the plurality of calibration tags are removed following the calibration procedure while the plurality of anchors remain.

16. The apparatus of claim 14 wherein a playing area is a basketball court, a hockey rink, in indoor football stadium, a tennis court, a volleyball court, a ping pong table, or other indoor sports facility, and further wherein the predetermined positions relative to the space are predetermined points relative to the playing area.

17. The apparatus of claim 14 wherein the plurality of anchors are in locations both on a plane of a playing area making up the space and a selected one of above or below the plane.

18. The apparatus of claim 14 further including a computing device comprising:

the processor a memory wherein the processor and the memory comprise circuits and software for performing the instructions on the storage medium.

19. The apparatus of claim 14 wherein the plurality of calibration tags are a subset of the plurality of movable tags.

* * * * *